J. H. ELWARD.
Corn-Planter.
No. 41,176. Patented Jan. 5, 1864.
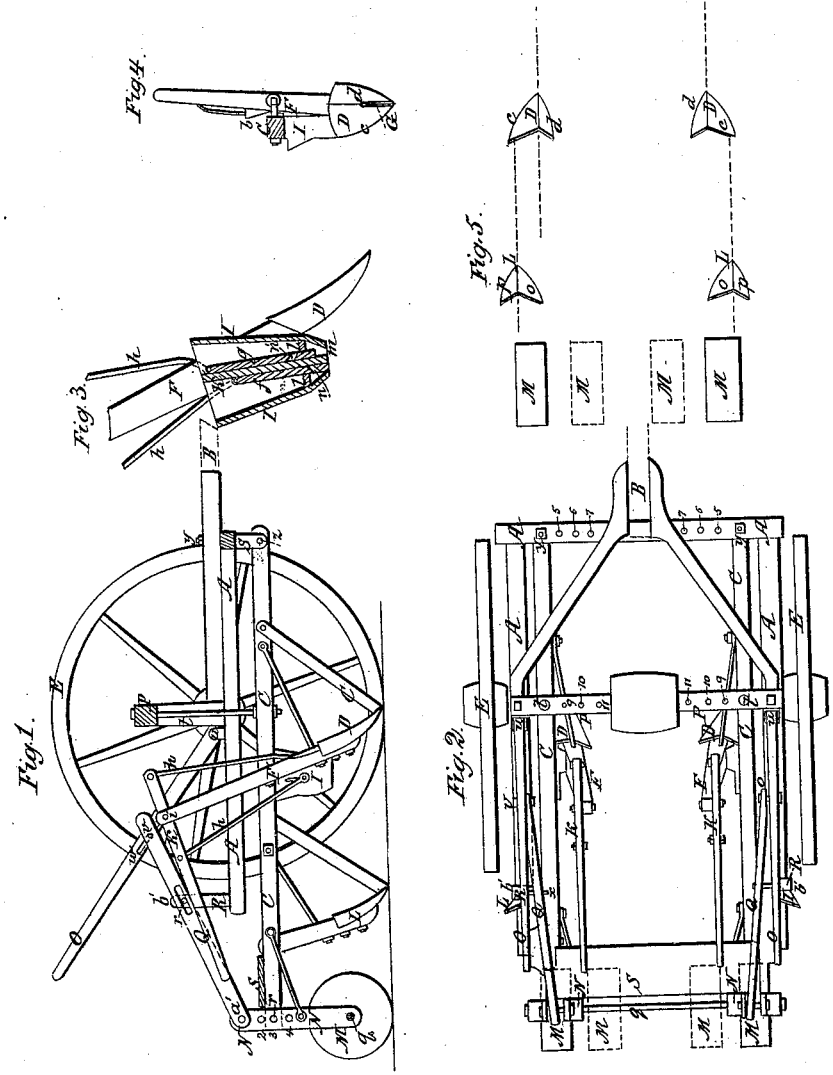

UNITED STATES PATENT OFFICE.

JOHN H. ELWARD, OF OTTAWA, ILLINOIS, ASSIGNOR TO HIMSELF AND W. H. W. CUSHMAN, OF SAME PLACE.

IMPROVEMENT IN CORN-PLANTERS.

Specification forming part of Letters Patent No. 41,176, dated January 5, 1864.

*To all whom it may concern:*

Be it known that I, JOHN H. ELWARD, of Ottawa, in the county of La Salle and State of Illinois, have invented certain new and useful Improvements in Corn-Planters; and I do hereby declare that the following is a full, clear, and exact description of the construction and operation of the same, reference being had to the accompanying drawings, in which—

Figure 1 represents a longitudinal vertical section of said corn-planter. Fig. 2 represents a top view of the same. Fig. 3 represents a longitudinal vertical section through the seed-box. Fig. 4 represents a front view of one of the plows, showing the attachment of the frame. Fig. 5 represents a detached view, hereinafter to be referred to.

My invention relates to the combination, with a seed-dropping device, of two cultivator-hoes, one in front, the other in the rear of it, and which are constructed and arranged in such a manner that the front hoe shall open the furrow and throw the clods outside of it, while the rear hoe shall cover the furrow with the fine soil only, thus preventing the clods from accumulating over the seed.

It also relates to the combination, with the cultivator-hoes described, of clod-breaking rollers, which are arranged in such a manner that they may be shifted horizontally on their shaft, for the purposes hereinafter described.

It further relates to the construction of a double-acting seed-dropping device operated by a single lever and combined with the front hoe, as herein described.

To enable others skilled in the art to make and use my invention, I will proceed to describe its construction and operation.

A represents the stationary or main frame of the seed-planter, to which the tongue or pole B is secured. It is supported by the wheels E.

C represents the hinged or adjustable frame, which is pivoted at $z$ to the front end of the main frame A by means of the hangers $s$, the bolts $y$ of which pass through either of the holes 5 6 7. The two sides of the frame are, besides, kept parallel by means of the bolts $t$, which may be passed through either of holes 9 10 11 of the beam P, and thus the two sides of the frame C can be spread or contracted to plant furrows of any desired width. The cultivator-hoes, as well as the dropping device, are secured to hinged frame C.

D represents the hoe in front of the seed-dropping device. It is secured to the stock F, which is hinged to the frame C at $a$, and which may thus be adjusted for planting the corn in furrows of different widths. I secure the stocks F in the desired position by means of the wedges $b$, which are driven between the stocks and the frame C. The shape of the hoe D, which opens the furrow, is such that the outer wing, $c$, thereof is larger than the inner wing, $d$. By this construction when the furrow is opened the heavy clods all turn outside and drop over the outer ridge of the furrow, while the fine soil remains in the furrow. A sharp blade or colter, G, extends from the points of the hoe, in an inclined position, up to the inner frame, C, to which it is secured, and its object is to cut the cornstalks as they are met by the hoe, which, when cut in two, are moved to both sides of the furrow by the action of the hoe D.

I represents the seed-box, which contains the grain to be planted. It is secured to the frame to the rear of the hoe D, and contains two vertical seed-slides, $f$ $g$, which are connected with the horizontal lever K by means of the rods $h$. The lever K is pivoted to the stock F at $i$, and the rods $h$ are secured to both sides of and at equal distances from the fulcrum $i$. Each operation of the lever operates the slides $f$ and $g$ simultaneously, in opposite sides of seed-box, in reverse directions. The seed-box I is divided at its center by a partition, $k$, on which the slides $f$ $g$ operate. Their lower ends pass through the bottom $l$ of the seed-box, and in their lowest position fill up the opening $m$, through which the seed escapes. Each of the seed-slides has a seed-cell, $n$, the sides of which have an oblique position and incline toward the grain which is in each of the compartments of the seed-box. Thus when the seed-slide descends the upper edge, 1, of the inclined cell $n$ cuts into the grain and insures the filling of the cell with the desired quantity of seed, while otherwise the seed-cells which are filled by passing through the grain are not filled perfectly and plant the grain unequally. When the seed-cell $n$ is filled it passes below the bottom $l$ of the seed-box, and the end of the seed-slide at the same time closes the aperture $m$ of the seed-box. On its return the slide rises and opens said aperture and the seed drops through it into the furrow.

L represents the plows to the rear of the seed-dropper for the purpose of covering the seed. They are provided with colters for cutting the corn and weed stalks, similarly to those of the hoes D. In the hoes L the inner wings, $o$, are larger than the outer wings, $p$, and the hoes are secured to the frame C in such a position that the point is in line with the outer ridge of the furrow made by the hoe D, as represented in dotted lines in Fig. 5. By this peculiar construction and position of the hoes the fine soil only of the outer ridge of the furrow is turned on the seed, and the latter is covered by it, and all clods remain outside of the same. To obtain a result similar to this, various devices in corn-planters, as well as cultivators, have been used, such as one-sided oblique shovels or hoes which are set alternately and in reversed positions, but which throw all the earth to one side of the furrow, or, where double-winged shovels are used for the same purpose, the wings are of equal sizes and act entirely different from the device herein described. I have found by actual experiment that by using shovels with wings of unequal size, and which are arranged as herein described, the operation of covering the furrow or seed with fine soil only is effected more perfectly than it could be done heretofore.

M represents two rollers, which serve to support the rear end of the machine and to pulverize such clods as may accidentally drop on the seed. They turn on the shaft $q$ and between the hangers N, which are secured to the frame C by means of the pins $r$. The position of these hangers may be adjusted, so as to raise or lower them, by means of the adjusting-holes 2 3 4, and thus the depth of the seed-furrow is adjusted. When the soil is wet or heavy the rollers M must not pass over the covered seed, as the soil would stick to them and the planting would be injured. In that case I withdraw the center rod, $q$, and place the rollers M inside the hangers N, as represented in red lines in Figs. 2 and 5, and they then only serve as supporting-wheels without passing over the furrow.

O represents the levers for raising and lowering the plows and seeding devices. There is one on each side of the machine to raise one of the sides independently of the other. The lever O has its fulcrum at $u$, and is connected with the lever Q by means of pin $v$, which passes through slot $w$, and which has its fulcrum on pin $x$ of the standard R of the main frame A, while the outer end of the lever Q is pivoted at $a'$ to the hanger N on the hinged frame C. By depressing the lever O the inner frame, C, together with plows, planting device, and rollers M, is raised from the ground for the purpose of moving the machine from one locality to another, and in that position the lever O is secured to the knob $b'$ on the outside of the standard R. The levers O and K are operated by hand from the seat S. The levers K may also be operated by a cam or other mechanical device attached to the machine.

Having thus fully described the nature of my invention, what I claim herein as new, and desire to secure by Letters Patent, is—

1. In combination with a seed-dropping device, the two hoes D and L, when the wings of their blades are of unequal width, and when constructed and arranged in the manner and for the purposes herein described.

2. In combination with the hoes D L, as herein described, the clod-breaking rollers M, when the latter can be shifted so as to act inside of the furrow, substantially in the manner and for the purposes herein described.

3. The double-slided seed-dropper, consisting substantially of the double seed-box I, seed-slides $f$ $g$, and double-acting lever K.

J. H. ELWARD.

Witnesses:
JULIUS HIRSH,
E. COHEN.